United States Patent [19]

Iturriaga Notario

[11] 3,926,284

[45] Dec. 16, 1975

[54] ADJUSTING DEVICE FOR ACTIVATING BRAKE SHOES

[76] Inventor: Luis Iturriaga Notario, Picos de los Artilleros 160, Moratalaz, Madrid, Spain

[22] Filed: June 27, 1974

[21] Appl. No.: 483,798

[30] Foreign Application Priority Data

July 2, 1973 Spain .............................. 193192[U]

[52] U.S. Cl. ...................... 188/196 BA; 188/79.5 K
[51] Int. Cl.² ......................................... F16D 65/60
[58] Field of Search .................. 188/79.5 K, 196 BA

[56] References Cited
UNITED STATES PATENTS

| | | | |
|---|---|---|---|
| 1,525,568 | 2/1925 | Chapin | 188/79.5 K |
| 2,296,026 | 9/1942 | Freeman | 188/79.5 K |

*Primary Examiner*—Duane A. Reger
*Attorney, Agent, or Firm*—Wenderoth, Lind & Ponack

[57] ABSTRACT

An automatic brake adjusting device includes an activating lever movable by a braking drive device and freely rotatably mounted about a camshaft which includes a cam for moving brake shoes against a brake drum. A ratchet wheel is fixed to the camshaft. A first ratchet cog is mounted on the activating lever and biased into engagement with teeth of the ratchet wheel. A rocking lever is mounted about an axis adjacent the ratchet wheel and has a second ratchet cog biased into engagement with teeth of the ratchet wheel at a position diametrically opposite the first ratchet cog.

2 Claims, 1 Drawing Figure

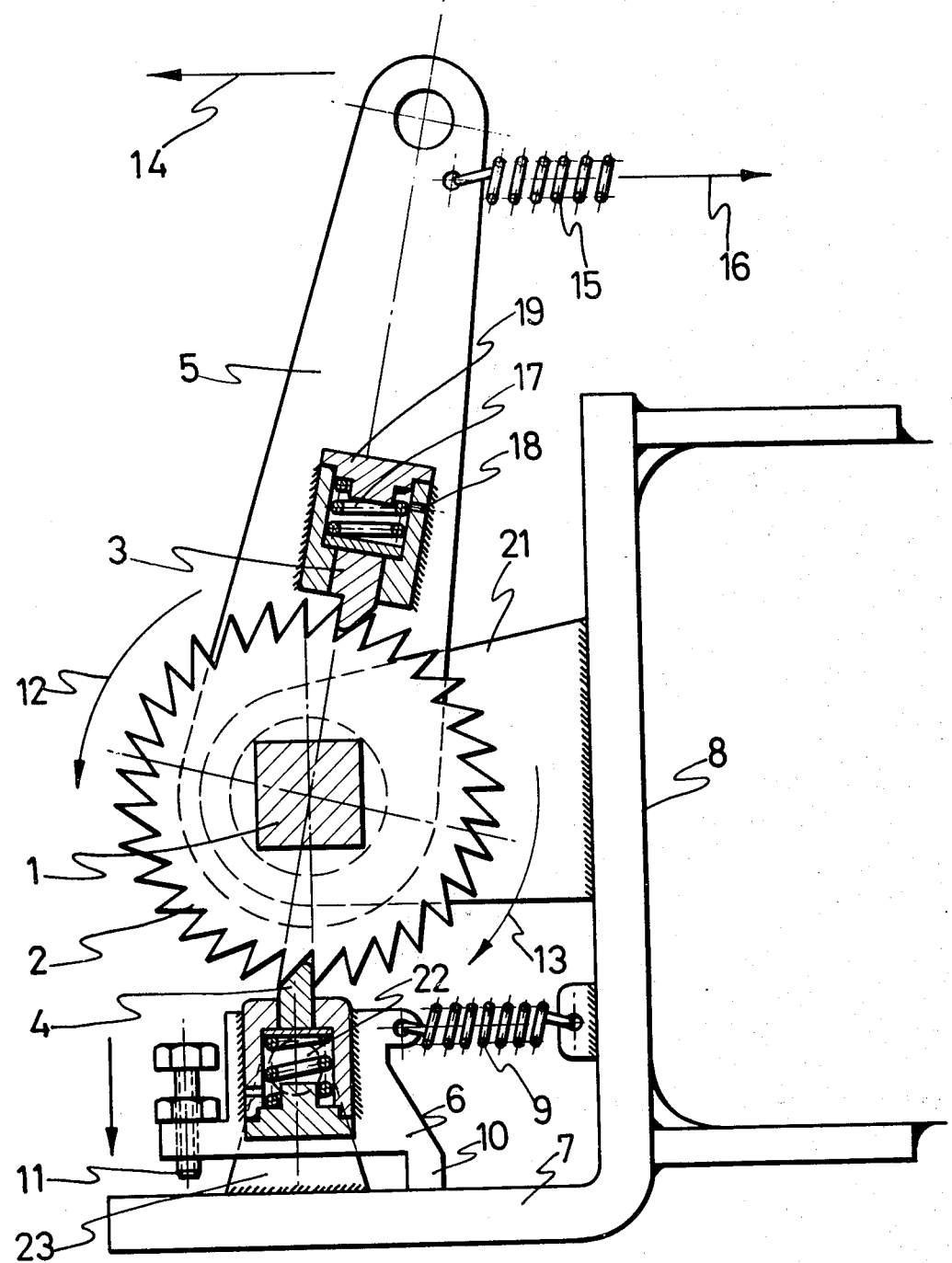

ADJUSTING DEVICE FOR ACTIVATING BRAKE SHOES

BACKGROUND OF THE INVENTION

The invention relates to a device for activating shoes in pneumatic brakes for vehicles, by means of which device two objects are simultaneously achieved: first, that the path of the piston of the driving system is kept constant, and second, that the shoes are automatically adjusted to be adjacent the brake drum, depending on the continuous wear of the linings of the shoes during use.

Before commencing the specific description of the features of the invention, a brief description of the features and the manner in which conventional pneumatic brakes operate will be made, emphasizing the drawbacks presented thereby.

A conventional pneumatic brake includes a pneumatic cylinder, or more normally a pneumatic membrane device having a piston which pushes a lever, which in turn, due to the fact that it is radially mounted on a shaft supported for rotation, causes such shaft to rotate a fraction of a revolution.

The shaft has at one of the ends thereof a dual cam which moves between the upper ends of the shoes, which are linked at their lower ends to fixed points and which are urged towards each other by means of a spring.

Thus, when the brake operates, air under pressure is allowed to enter the cylinder or membrane which constitutes the driving device. Before operation the piston is maintained at the point along its path coinciding with the end of the device through which the air under pressure is fed. This is due to the action of a spring which urges the piston to be maintained in such position.

When the air enters and pushes the piston in order to cause its displacement against the force of the positioning spring, the lever connected to the rod of the piston is angularly displaced, and thus the camshaft and the cam rotate, which rotation in turn causes the separation of the shoes, acting against the force of the shoe return spring. In this way, the shoes contact the drum of the wheel to produce braking.

As soon as the air pressure ceases, the piston of the driving device returns, due to its spring, to its rest position adjacent the air receiving end of the cylinder or membrane. Thus, the lever connected to the piston rod (which normally has an additional return spring), the camshaft and the cam return to their original positions. The shoes thus are moved toward one another and are separated from the drum due to the action of the shoe return spring.

The result of such arrangement is a series of problems due to the fact that the linings of the shoes are progressively worn during use.

Specifically, when the linings of the shoes are new, positioning of the cam is controlled in such a way that the shoes, in rest position, are very close to the drum, and separated therefrom only by an amount such that a slight activation of the brake does not result in an immediate and brusque braking of the wheel in question. However, the distance or play of the brake is sufficiently small so that braking is satisfactory with only a slight displacement of the piston of the pneumatic driving device.

However, as the linings of the shoes become worn during use, the rest position of the braking surface of the shoes, once braking has taken place, is progressively further away from the surface of the drum.

It is evident from the above that the path to be travelled by the shoes in order to contact the drum also becomes progressively longer. Therefore, the reaction speed of braking becomes progressively less, in relation to the moment at which the driver presses the corresponding pedal.

On the other hand, and to produce a larger displacement of the shoes, it is necessary that the piston of the driving device effect a distance of travel which is also much longer. Thus, the volume of necessary air under pressure progressively increases, and it is therefore necessary for the vehicle to have a very powerful compressor and high capacity drums.

In practice, these two serious drawbacks are overcome to a certain extent by frequent adjustment of the brakes, wherein the rest position of the shoe activating cam is readjusted, so that the linings of the shoes are positioned at a desired optimum distance from the surface of the drum. However, it is understood that such adjustment presents problems, primarily that the vehicle cannot function during such adjustments with the consequent economical losses, and that such adjustment is carried out entirely manually. Therefore, adjustment of the brakes is normally unequal, whereby each wheel responds to braking at a different speed and with a different braking pressure.

SUMMARY OF THE INVENTION

In view of the above discussed disadvantages, the object of the present invention is to provide a device which: a) automatically moves the shoes towards the drum, as the linings become worn; and b) automatically returns the piston of the pneumatic driving device to its rest position, so that the size of the air chamber is not increased and that therefore neither a powerful compressor nor a high capacity drum is necessary.

The advantages of a device of this type, as is evident from the above discussion, are that there is no need to take the vehicle out of operation until the linings of the shoes have been completely worn out, that the brakes always function exactly as if the linings were new, and that the positioning of the shoes is always regular and exact so that the entire wheel brakes equally.

These advantages are obtained according to the invention by providing a device wherein the shoe activating camshaft has solidly fixed thereon one pinion or ratchet wheel having teeth along its entire periphery, or alternatively, along two sectors having the same length and the same number of teeth. The ratchet wheel is functionally connected to two fingers, one mounted on the activating lever which receives movement from the pneumatic device, and the other mounted on a return rocking lever mounted on a fixed support.

The activating lever, connected to the rod of the pneumatic driving device, is mounted about the camshaft for free rotation thereabout, and the rocking lever, which can rotate within the same plane as that occupied by the ratchet wheel, is constantly urged by a spring in the same direction in which the ratchet wheel moves during braking operation. The rocking lever has a pair of fixed or adjustable abutting elements or stops, one on each side thereof, which limit is oscillating movements in opposite directions.

BRIEF DESCRIPTION OF THE DRAWINGS

A more detailed description of the invention, including one embodiment thereof, as well as the functional behavior of such embodiment, will now be made with reference to the accompanying drawings, wherein:

The single FIGURE is a partial sectional representation of a device constructed according to the invention. The pneumatic driving device and the shoe activating cam, the shoes themselves and the drum (all of which do not form part of this invention) have been omitted for brevity and clarity to achieve a better understanding of the invention.

DETAILED DESCRIPTION OF THE INVENTION

In the drawing, a camshaft 1 (illustrated in the form of a square and having a shoe contacting cam, not shown) is rotatingly supported by bearings 21, projecting from a support 8, which is solidly attached to a fixed point of the frame. Support 8 has a leg 7 supporting a rocking lever 6 which will be described in more detail below.

One or more ratchet wheels 2 are mounted on camshaft 1 (in the illustrated embodiment there is only one such wheel). Wheel 2 is fixed to shaft 1 by any suitable system. For example, as illustrated shaft 1 has a faceted or square configuration fitted within a central opening of similar configuration in the ratchet wheel or wheels.

Brake activating lever 5 is mounted to rotate freely about shaft 1 and at its upper end is conventionally connected to the piston rod of a pneumatic driving device (neither of which are shown) and is also provided with a conventional return spring 15.

A locking finger or cog 3 is arranged on lever 5 in such a way that it is capable of pulling the wheel 2, as shown by arrow 12, when the lever 5 is moved in the braking direction, shown by arrow 14. When more than one wheel 2 is provided, an equal number of fingers 3 are likewise provided. Finger 3 is constantly urged towards the coupling position and into engagement with the teeth of wheel 2 by a spring 17 enclosed within a chamber and provided with means 19 to adjust the stress of the spring and with openings 18 for greasing. It will be apparent that movement of lever 5 in the direction of arrow 16 allows finger 3 to slide over the teeth of wheel 2 against spring 17.

A similar finger 4, one for each ratchet wheel 2, is mounted on the rocking lever 6 to engage the teeth of wheel 2 approximately diametrically opposite the finger 3. Finger 4 is mounted and urged toward wheel 2 in a manner similar to that of finger 3.

The rocking lever 6 is mounted for limited rotation within the same plane as that occupied by the ratchet wheel or wheels 2 about a shaft 22 which is supported by bearings 23 installed on the leg 7 of the support 8. The rocking lever 6 has at each of the sides thereof an abutment element which limits the oscillating rotational movements thereof, and is urged by a low strength spring 9 in the same direction as the h direction of rotation of the ratchet wheel 2 during a braking operation.

In the embodiment illustrated, abutment element 10, which limits the oscillation of rocking lever 6 when moving in the same direction as the ratchet wheel during a braking operation, is fixed, while abutment element 11, which limits the oscillation of rocking lever 6 in the opposite direction, is adjustable. However, it will be evident that both abutment elements 10 and 11 may be made fixed or adjustable.

With this basic arrangement of elements, functioning of the device is as follows:

When the linings of the shoes (not illustrated) are new and the driving cam (also not illustrated) is mounted on shaft 1 in accordance with this condition, a slight angular displacement of lever 5 in the braking direction, which is that indicated by arrow 14, will produce an immediate reaction of the shoes in the following manner.

When lever 5 is moved in the direction of arrow 14, and in spite of it being mounted to move freely about camshaft 1, it rotates the camshaft and cam through a fraction of a turn, by the meshing of the locking finger 3 with the teeth of the wheel 2. Since the linings of the shoes are new, and consequently the distance which separates them from the internal surface of the drum is small, the distance of movement to be effected is also small, and the necessary rotation of the camshaft 1 and the cam is also reduced.

While wheel 2 effects this short turn in the direction of braking as indicated by arrow 12, the rocking lever 6 tends to accompany the same, since on the one hand it is urged in this direction by spring 9, and on the other hand because the wheel itself effects a certain pushing force through finger 4. However, the abutment element 10 prevents the rocking lever 6 from such oscillation. Thus the pushing force of the teeth of wheel 2 is reflected in a slight retraction of the finger 4. However, finger 4 does not slide or snap over any of the teeth of wheel 2, since the amount of turning of the wheel 2 is very slight.

Once braking has taken place, i.e., when the air pressure which has caused displacement of lever 5 in the direction of arrow 14 ceases, lever 5 is returned to its rest position in the direction of arrow 16, by the action of spring 15 and by the action of the piston of the pneumatic device, while it turns freely with respect to the camshaft 1. The ratchet wheel 2 also returns to the rest position, turning in the direction of arrow 13, independently of lever 5 to which it is no longer connected, through pushing force exerted on the cam by the shoes caused by the conventional shoe return spring.

However, when the linings of the shoes have become considerably worn, braking is effected as follows:

The angular displacement of lever 5 in the direction of arrow 14 takes place in the same manner as described above, and causes rotation of wheel 2 through the finger 3. However, camshaft 1 and the cam must rotate a greater distance than described above to cause the shoes to contact the drum. This greater amount of rotation of the ratchet wheel 2 causes finger 4 mounted on the rocking lever 6 to be completely retracted and to slide over one tooth of wheel 2. When this tooth has passed finger 4, the finger is urged outwardly to engage between the teeth following those which were originally engaged.

When the braking ceases, lever 5 returns to its rest position, following the same operative steps as discussed above, and wheel 2 is again driven by the return spring of the shoes, thus tending to be returned to its original position. However, the teeth of wheel 2 abut with finger 4, and only permits the wheel to turn by an amount by which the rocking lever 6 can oscillate about the shaft 22, i.e., until abutment element 11 contacts support leg 7.

The cam mounted on camshaft 1 consequently does not return to its original position, but has been returned to a new rest position, at which the shoes, in spite of the force of the return spring thereof, are positioned more closely to the drum.

Thus, the shoes are automatically adjusted depending on the wear of the linings, and simultaneously the activating lever 5 is always returned to its original position, independently of any wear of the shoes. Thus, the piston of the pneumatic driving device is always located in the same position, whereby the size of the air chamber is not repeatedly enlarged.

It can be seen that the greater the number of teeth on the ratchet wheel, the finer will be the regulation of the adjustment of the shoes.

It can likewise be seen that in practice and according to the above description, the device can include plural ratchet wheels, each having corresponding fingers 3 and 4, to prevent the system from becoming useless due to the breakdown of one element.

Also, only two diametrically opposite portions of the periphery of the ratchet wheels need have teeth without the essence of the process or the manner of functioning the device being varied in any way whatsoever.

I claim:

1. An automatic adjusting device for automatically adjusting vehicle brakes of the type including a drum, a pair of shoes having lining thereon and moveable against a biasing force into braking contact with said drum, a camshaft having a cam thereon and mounted such that rotation of said camshaft causes said cam to move said shoes into contact with said drum, and a braking drive device operatively connected to said cam shaft for selectively causing rotation thereof; said automatic adjusting device comprising:

at least one ratchet wheel rigidly mounted on said cam shaft;

an activating lever freely rotatably mounted at a first end thereof about said cam shaft and connected at a second end thereof to said braking drive device;

at least one first ratchet cog mounted on said activating lever and radially biased into engagement with teeth of said at least one ratchet wheel, said first ratchet cog comprising means for rotating said ratchet wheel and said camshaft when said activating lever is moved by said braking drive device;

a rocking lever mounted for rotation, adjacent the periphery of said ratchet wheel, about an axis parallel to the axis of said camshaft;

at least one second ratchet cog mounted on said rocking lever and radially biased into engagement with teeth of said ratchet wheel at a position diametrically opposite said first ratchet cog, rotation of said ratchet wheel causing rotation of said rocking lever;

first abutment element means on a first side of said rocking lever for limiting the extent of rotation of said rocking lever in a first direction;

second abutment element means on a second side of said rocking lever for limiting the extent of rotation of said rocking lever in a second direction; and adjustment means for adjusting the position of at least said second abutment element means.

2. An automatic adjusting device as claimed in claim 1, wherein both said first and second abutment element means have adjustment means for limiting the positions thereof.

* * * * *